United States Patent [19]
Pritchard et al.

[11] 3,885,198
[45] May 20, 1975

[54] HIGH VOLTAGE REGULATOR

[75] Inventors: Dalton Harold Pritchard, Princeton, N.J.; Alfred Christian Schroeder, Southampton, Pa.

[73] Assignee: RCA Corporation, New York, N.Y.

[22] Filed: Aug. 6, 1973

[21] Appl. No.: 385,777

[52] U.S. Cl. .................................. 315/411; 315/400
[51] Int. Cl. ............................................ H01j 29/70
[58] Field of Search .......... 315/27 SR, 27 TD, 27 R, 315/28, 29, 411, 400; 307/88 R

[56] References Cited

UNITED STATES PATENTS

| | | | |
|---|---|---|---|
| 3,767,960 | 10/1973 | Ahrens | 315/27 TD |
| 3,803,447 | 4/1974 | Wolber | 315/27 SR |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

In a horizontal deflection and high voltage generating circuit in a television receiver, the high voltage is regulated to remain substantially constant with variations in picture tube beam current variation and receiver direct current power supply variation. A high voltage variation representative signal is coupled to a regulator circuit including a saturable reactor magnetically biased such that a failure comprising either a short or open circuit in the regulator circuit causes the input energy to the deflection circuit not to increase beyond a predetermined amount.

5 Claims, 6 Drawing Figures

HIGH VOLTAGE REGULATOR

BACKGROUND OF THE INVENTION

This invention relates to a voltage regulator for a beam deflection system.

In beam deflection systems such as utilized in television receivers, it is customary to develop the ultor supply voltage for the picture tube by the rectification of flyback pulses derived from a transformer winding in the horizontal deflection system during the retrace interval of each deflection cycle. It is known that variations in high voltage can be caused by variations in picture tube current in response to video signals modulating the electron beam or beams or variations in the alternating current line voltage utilized to energize the television receiver. A variation in the high voltage may undesirably change the size of the scanned raster on the picture tube viewing screen. Further, an uncontrolled rise in high voltage could result in arcing in such components as the deflection yoke or picture tube and could cause excessive radiation from the picture tube.

To avoid the problems caused by high voltage variation, it is known that a regulating circuit may be utilized with the horizontal deflection system to keep the energy in the horizontal output transformer relatively constant.

One scheme for regulating the high voltage against beam current and power line variations is disclosed in U.S. Pat. No. 3,517,253, entitled "Voltage Regulator," and issued June 23, 1970, to Wolfgang F. W. Dietz. The voltage regulator disclosed therein is useful in conjunction with a retrace driven horizontal deflection circuit utilizing two bidirectionally conducting switches to commutate energy and supply it to a deflection winding and to an output transformer from which the ultor voltage is derived. This arrangement provides satisfactory high voltage regulation under normal conditions. However, it would be desirable to provide a regulator circuit which would limit the high voltage to a predetermined level in the event of either a short or open circuit occurring in the regulator circuit.

In accordance with the invention a regulator circuit for a beam deflection system is provided. A variable inductance is coupled to a terminal supplying operating potential and to switching means operable from a first to a second state during each deflection cycle. An output circuit including a deflection winding and a transformer winding is coupled to the switching means for receiving alternating current energy therefrom. Regulating means are coupled to the output circuit and to the variable inductance and are responsive to changes in energy levels therein for providing a control signal which controls the inductance of the variable inductance. The variable inductance means includes biasing means for magnetically biasing the variable inductance means for limiting the peak current supplied to the switching means independent of the operation of the regulating means.

A more detailed description of a preferred embodiment of the invention is given in the following pages in conjunction with the accompanying drawing, of which:

FIG. 1 is a circuit diagram of a horizontal deflection system embodying a regulator circuit in accordance with the invention;

FIGS. 2*a*–2*d* illustrate waveforms obtained at various points in the circuit of FIG. 1; and FIG. 3 is a graph plotting regulator control current against inductance to illustrate the principles of the invention.

DETAILED DESCRIPTION OF THE INVENTION

Figures 1, 2A, 2B, 2C, 2D, 3:
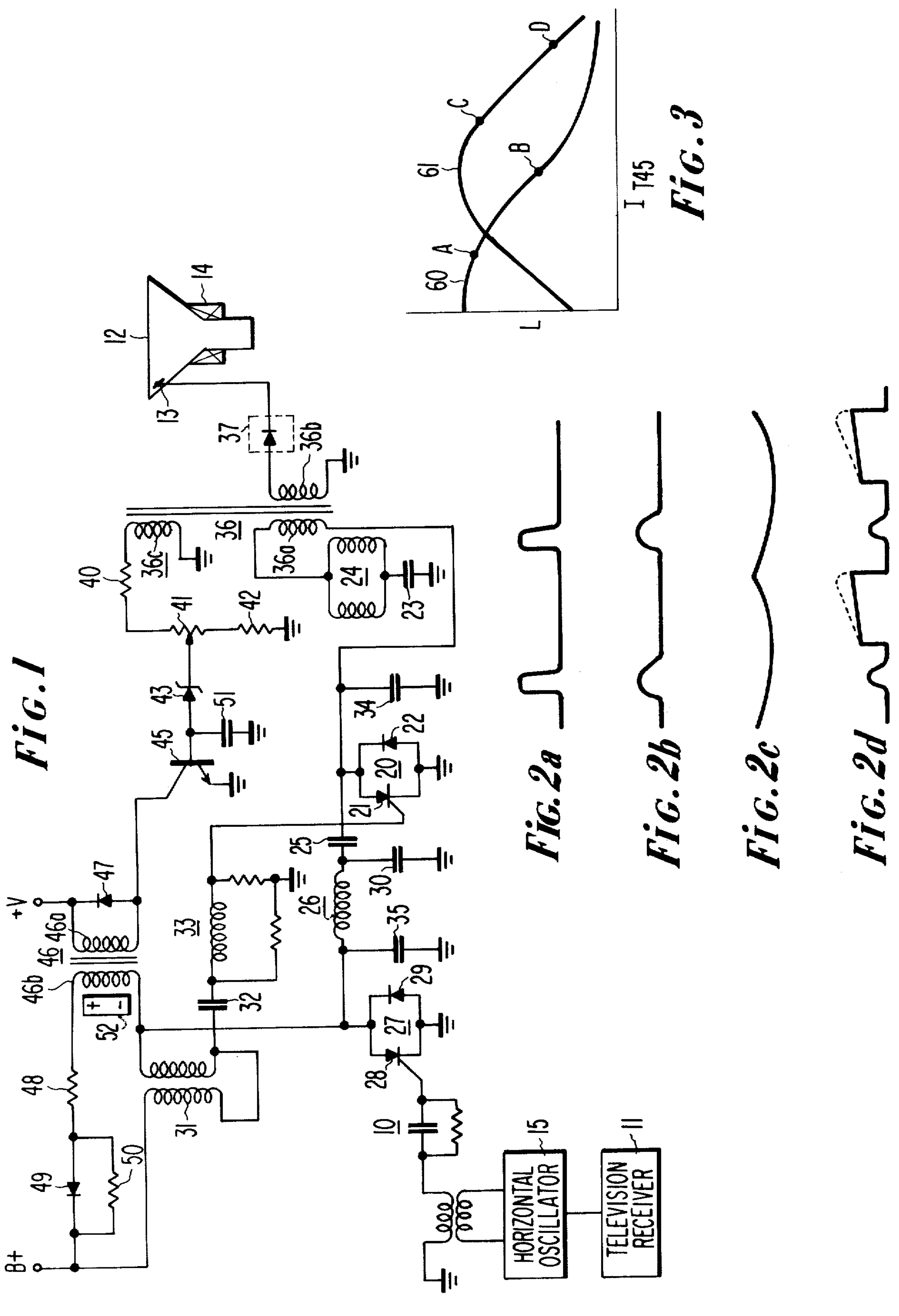

In FIG. 1, a television receiver 11 which may be of a generally conventional type is illustrated in block form, with, however, details of the horizontal deflection system and associated high voltage supply shown schematically.

The output of the sync separator portion of receiver 11 is supplied to the vertical deflection circuits and to a horizontal deflection oscillator 15. The vertical deflection circuits generate a vertical deflection wave for application to the vertical deflection coils of a deflection yoke 14 attached to a picture tube 12, under the control of vertical synchronizing pulses derived from the sync separator apparatus. The horizontal oscillator 15, which may be a conventional blocking oscillator, develops a periodic switching voltage under the control of horizontal synchronizing pulses derived from the sync separator apparatus. The oscillator 15 is associated with suitable deflection AFC apparatus (not shown) for assuring the desired synchronization.

The periodic switching voltage developed by oscillator 15 is applied to a horizontal deflection circuit comprising the schematic portion of FIG. 1.

The deflection circuit generally is of the type shown and described in U.S. Pat. No. 3,452,244 issued to Wolfgang F. W. Dietz on June 24, 1969, and entitled, "Electron Beam Deflection and High Voltage Generation Circuit." Briefly stated, the deflection circuit comprises a bilaterally conductive trace switching means 20 comprising a silicon controlled rectifier (SCR) 21 and a diode 22 for coupling a relatively large energy storage capacitor 23 in a closed circuit with the horizontal deflection windings 24 during the trace portion of each deflection cycle. A first capacitor 25 and a commutating inductor 26 are coupled between trace switching means 20 and a bilaterally conductive commutating switching means 27. Switching means 27 comprises a silicon controlled rectifier 28 and a diode 29. A second capacitor 30 is coupled from the junction of capacitor 25 and inductor 26 to ground. Transient suppression capacitors 34 and 35 are coupled from switching means 20 and 27, respectively, to ground. A main voltage supply B+ is coupled to a relatively large supply inductor 31, which in turn is coupled to the junction of inductor 26 and commutating switching means 27.

First triggering means 33 is coupled from a capacitor 32, one end of which is coupled to supply inductor 31, to the gate electrode of SCR 21 for initiating conduction therein during the trace portion of each deflection cycle. Second triggering means 10 is coupled from horizontal oscillator 15 to the gate electrode of SCR 28 for initiating conduction therein near the end of the trace portion of each deflection cycle.

Trace switching means 20 is coupled through a primary winding **36*a* of a horizontal output transformer 36 to horizontal deflection coils 24. A high voltage winding 36*b* of transformer 36 provides stepped up voltage flyback pulses. These pulses are rectified by the high voltage rectifier assembly 37 for application to the high voltage or ultor terminal 13 of kinescope 12. The capacitance of kinescope 12** serves as the high voltage charge capacitor.

An auxiliary winding 36c of transformer 36 provides a source of positive pulses as shown in FIG. 2a. These pulses are the flyback pulses occurring during the retrace portion of each horizontal deflection cycle. The pulses are coupled through a resistor 40, a potentiometer 41, and another resistor 42 which provide a voltage divider network for the pulses. The wiper arm of potentiometer 41 is coupled to the cathode terminal of a zener diode 43. The anode of zener diode 43 is coupled to the base electrode of a regulator transistor 45. A capacitor 51 is coupled from the anode of zener diode 43 to ground. The capacitance of capacitor 51 is selected to be larger than the junction capacitance of zener diode 43 such that any variation of zener diode capacitance characteristics from one diode to another will have minimum effect on the operation of the circuit.

The emitter electrode of transistor 45 is coupled to ground and the collector electrode is coupled through the parallel combination of a control winding 46a of a saturable reactor 46 and a recovery diode 47 to a source of positive potential +V. The voltage of this source may be about 75 volts. One end of the secondary or load winding 46b of reactor 46 is coupled through a resistor 48 and the parallel combination of a recovery diode 49 and a resistor 50 to a source of positive potential B+. The voltage of this source may be about 160 volts. The other end of secondary winding 46b is coupled through supply inductor 31 to the B+ supply. Further, this terminal of control winding 46b is also coupled to switching means 27 and commutating inductor 26. A biasing magnet 52 for magnetically biasing saturable reactor 46 is disposed adjacent thereto.

During operation, at the beginning of the trace portion of each horizontal deflection cycle, the current in horizontal deflection coils 24 is at a maximum negative amplitude and is flowing through forward biased diode 22 through winding 36a and the deflection coils 24 to charge capacitor 23. The deflection current declines substantially linearly thereafter, and at approximately mid-way through the trace portion of the cycle, the current through deflection coils 24 passes through zero, reverses and switches from diode 22 to SCR 21. SCR 21 is placed in standby condition in preparation for this switching of current paths by means of a gating signal provided by triggering circuit 33. As SCR 21 starts to conduct, capacitor 23 now transfers energy from itself to deflection coils 24 as the current passes through SCR 21.

During the time that trace switching means 20 is conducting as described above, the commutating switching means 27 is open or nonconductive. Capacitors 25 and 30 are coupled in parallel across the current supply comprising inductor 26 and supply inductor 31 coupled to the main B+ supply. Inductor 31, which stored energy during the previous commutating portion, during the trace portion of the deflection cycle transfers a portion of its stored energy to capacitors 25 and 30 while they are coupled in parallel. The voltage across parallel capacitors 25 and 30 typically increases during this interval as shown by the solid line ramp portion in FIG. 2d. This is the voltage across commutating switch 27. A portion of the energy thus stored in capacitors 25 and 30 is transferred during the retrace portion of each deflection cycle to deflection winding 24 and to the voltage generating circuits associated with transformer 36 to replenish the losses incurred during the deflection cycle.

In order to initiate the retrace portion of each deflection cycle and to transfer the energy from capacitors 25 and 30 to the transformer 36 and deflection coils 24, a pulse is produced by horizontal oscillator 15 several microseconds before the desired end of the trace portion of the deflection cycle. This pulse is shaped by triggering means 20 and the resultant waveform is applied to the gate electrode of commutating SCR 28. SCR 28 commences conduction and thereby completes a first closed circuit path comprising SCR 28, inductor 26 and capacitor 25 and a second circuit path comprising SCR 28, inductor 26 and capacitor 30. The current in deflection winding 24 temporarily continues to increase since trace SCR 21 remains conductive. The energy stored in capacitors 25 and 30 is circulated in the first and second paths in a resonant manner.

At the same time, inductor 31 is coupled by commutating SCR 28 directly across the B+ supply, producing an approximately linearly increasing current and substantial energy storage in inductor 31. The current component associated with capacitor 25 serves to turn off SCR 21 because that component flows through SCR 21 in the reverse direction, and after a further short interval of conduction by trace diode 22, the retrace portion of the deflection cycle is initiated.

During the retrace portion the current in horizontal deflection coils 24 is reversed as a result of a resonant half-cycle energy exchange between coils 24 and a combination of capacitors 25 and 30, the inductor 26 and the equivalent tuned circuit of transformer 36. A high voltage flyback pulse waveform is produced during this retrace portion in the transformer winding 36b and is rectified by the high voltage rectifier unit 37 for producing a direct operating voltage of the order of 25,000 volts at the ultor terminal 13 of kinescope 12. The magnitude of the high voltage pulse is related directly to the peak magnitude of the deflection current in coils 24 and to the magnitude of the energy associated with capacitors 25 and 30 at the beginning of the retrace portion of the deflection cycle. The peak magnitude of the deflection current also is dependent upon the energy associated with capacitors 25 and 30. As described in the aforementioned U.S. Pat. No. 3,517,253, the values of capacitors 25 and 30 and inductor 26 may be selected such that in the absence of additional regulating means, a percentage change in peak deflection current produces at least a one-half, but preferably equal, corresponding percentage change in high voltage.

In addition to the regulation produced by selecting the values of the components stated just above, additional regulating means in accordance with the invention are provided for limiting the high voltage in the event of an open or short circuit in the regulating circuit providing a control current to winding 46a of saturable reactor 46.

An auxiliary winding 36c of transformer 36 provides a source of positive pulses occurring during the retrace interval of the deflection cycle. These pulses are illustrated in FIG. 2a. Any variation of the high voltage will be correspondingly reflected in the amplitude of the pulses obtained from winding 36c. These pulses are coupled from the winding through a voltage divider comprising resistor 40, potentiometer 41 and resistor 42, the latter being connected to ground. The pulses are coupled via the wiper arm of potentiometer 41 through the zener diode 43 to the base electrode of regulator transistor 45.

The collector current of transistor 45, illustrated in FIG. 2*b*, will vary as the voltage level of the pulses applied to the transistor differs from the reference voltage provided by the series connection of zener diode 43 and the base-emitter junction of transistor 45. Assuming an increase in the B+ supply voltage, which would tend to produce an increase in the ultor supply and in the deflection current, there will be an increase in the positive voltage level of the pulses coupled to the base of transistor 45. Such signals will cause transistor 45 to conduct with the resultant collector current as illustrated in FIG. 2*b*. This current, conveniently called a control current, will be conducted through the control winding 46*a* of reactor 46. The increasing current in control winding 46*a* has the effect of reducing the inductance of the secondary winding 46*b*. The variation of current in winding 46*b* is illustrated in FIG. 2*c*. Since winding 46*b* is in parallel with supply inductor 31, the inductance of this parallel combination is also reduced. The decreased inductance of this parallel inductor increases the voltage across capacitors 25 and 35 during the initial half of the trace interval but decreases during the last half of trace (see dotted line portion of waveform 2*d*) as energy is returned via inductor 31 to the B+ supply. This results in the energy available for transfer to the high voltage circuit and deflection windings 24 being maintained substantially constant. When the B+ voltage decreases, the inductance of winding 31 is increased to maintain constant image width and high voltage.

If the high voltage decreases due to increased kinescope beam current, conduction in transistor 45 will decrease. This will result in an effective increased inductance of the parallel combination of reactor secondary winding 46*b* and supply inductor 31, which in turn allows more energy to be stored in capacitors 25 and 30. This increased stored energy will result in an increase in the high voltage generated by the deflection circuit and coupled to ultor terminal 13.

The voltage source +V, which is coupled to the collector electrode of transistor 45, is unregulated. Therefore, any variation in this voltage, such as caused by variations in the AC power line voltage, will alter the conduction characteristics of regulator transistor 45 and will result in a compensating change in the generated high voltage ultor supply.

The operation of the circuit thus far has described the normally expected situations of how deflection current and high voltage are regulated over an expected range of beam current and power line voltage variations. In conjunction with FIG. 3, an explanation will be given describing the operation of the circuit without and with the biasing magnet 52 under conditions of the control current supplied by transistor 45 being short circuited or open circuited as could possibly be caused by failure of a component in the regulator circuit.

In FIG. 3 control current for the control winding 46*a* obtained from the conduction of transistor 45 is plotted along the ordinate and the net inductance of input reactor 31 and winding 46*b* is plotted along the abscissa. Curve 60 is a plot without the use of permanent magnet 52. It can be seen that without any control current the inductance is a maximum. The resulting high voltage and deflection current would also be maximum as described above. As control current increases the inductance decreases, with a corresponding decrease in high voltage and deflection current. The normal operating range over which the regulator circuit works is between the points A and B on the curve 60. In the event of a short circuit in the regulator circuit, such as a short in the collector-emitter path of transistor 45, the control current would be a maximum and the high voltage and deflection current would be held down as the regulator circuit would be operating in the region to the right of point B of curve 60. However, in the event of an open circuit, such as would occur if the collector-emitter path of transistor 45 opened, the control current would be zero and the inductance would be a maximum. This would undesirably result in excessively high deflection current and high voltage. This condition could widen the scanned raster undesirably, could result in arcing within the picture tube and could cause breakdown of such components as the deflection yoke. Further, unless some other protection circuit were utilized, the excessive high voltage could cause undesirable radiation from the picture tube.

Curve 61 of FIG. 3 illustrates the operating conditions of the regulator circuit including the utilization of biasing magnet 52 in accordance with the invention. The poles of the magnet are oriented such that when the magnet is disposed adjacent to the saturable reactor 46, or adjacent to the core of the reactor, it magnetically biases the reactor so that in the absence of a control current the inductance of winding 46*b* is a minimum. Thus, the parallel combination of windings 31 and 46*b* is a minimum and the deflection current and high voltage are held at relatively low limit values. For normal operation a slightly higher control current is required in transistor 45 to overcome the opposite polarity biasing flux produced by the magnet 52. The normal operating region for the regulator circuit is between points C and D of curve 61, under which conditions the regulator circuit operates as described above in conjunction with FIGS. 1 and 2. In the event of a short circuit causing a maximum control current, the operation would be to the right of point D of curve 61 and the deflection current and high voltage would be held to relatively low limits. In the event of an open circuit resulting in zero control current, the biasing flux produced by magnet 52 results in a low inductance which also limits the deflection current and high voltage to relatively low limits.

What is claimed is:

1. In a deflection system, a voltage regulator, comprising:

a terminal supplying operating current;

variable inductance means coupled to said terminal;

switching means coupled to said variable inductance means for receiving operating current therefrom and operable from a first to a second state during each deflection cycle;

output circuit means including a deflection winding and a transformer coupled to said switching means for receiving alternating current energy therefrom during each deflection cycle;

regulating means coupled to said output circuit and to said variable inductance means and responsive to the amplitude of energy in said output circuit means for controlling the inductance of said variable inductance means;

said variable inductance means including biasing means for providing a fixed magnitude magnetic field component in said variable inductance means for limiting the peak current supplied to said switching means independent of the operation of said regulating means.

2. A voltage regulator according to claim 1 wherein said variable inductance means includes a first inductance coupled to said terminal and said switching means and a saturable reactor coupled in circuit with said first inductance, said regulating means being coupled to a winding of said saturable reactor for controlling the amount of current therein and thereby determining the net inductance of said variable inductance means.

3. A voltage regulator according to claim 2 wherein said biasing means comprises a permanent magnet disposed relative to said saturable reactor for magnetically biasing said reactor.

4. In a deflection current and high voltage generating system in which energy consumed by the deflection and high voltage circuits is replenished each deflection cycle through an inductance, a regulator circuit comprising:

a terminal supplying operating current;

first inductance means coupled to said terminal;

deflection current switch means coupled to said first inductance means for receiving operating current therefrom during each deflection cycle for generating trace and retrace interval portions during each deflection cycle;

output circuit means including a deflection winding and a transformer coupled to said switch means for producing scanning current in said deflection winding and retrace pulses in said transformer;

regulating control means coupled to said output circuit and responsive to voltage changes representative of voltage changes of said retrace pulses for producing a control current;

second inductance means comprising a saturable reactor including a first winding coupled to said regulating control means for receiving said control current and a second winding coupled in circuit with said first inductance means; and means for providing a fixed magnitude magnetic field component in said saturable reactor independent of the operation of said regulating control means such that in the event of an open circuit or short circuit condition of said control current the net inductance of said first inductance means and said second winding is decreased relative to the net inductance presented under a condition of a normal range of control current for limiting the operating current passed to said output circuit means for limiting the voltage of said retrace pulses.

5. A voltage regulator according to claim 4 wherein said means for magnetically biasing said saturable reactor comprises a permanent magnet.

* * * * *